United States Patent
Kurihara et al.

(10) Patent No.: US 11,938,870 B2
(45) Date of Patent: Mar. 26, 2024

(54) VEHICLE COMPOUND-EYE CAMERA

(71) Applicant: DENSO CORPORATION, Kariya (JP)

(72) Inventors: Yosuke Kurihara, Toyonaka (JP);
Yasuki Furutake, Kariya (JP);
Tatsuhiko Futamura, Kariya (JP);
Hiroto Hayashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/387,455

(22) Filed: Jul. 28, 2021

(65) Prior Publication Data

US 2022/0105878 A1 Apr. 7, 2022

(30) Foreign Application Priority Data

Oct. 1, 2020 (JP) .................................. 2020-166693

(51) Int. Cl.
*H04N 23/90* (2023.01)
*B60R 11/04* (2006.01)
*H04N 23/51* (2023.01)
*B60R 11/00* (2006.01)

(52) U.S. Cl.
CPC ............. *B60R 11/04* (2013.01); *H04N 23/51* (2023.01); *B60R 2011/0026* (2013.01); *B60R 2300/105* (2013.01); *B60R 2300/107* (2013.01)

(58) Field of Classification Search
CPC ............. B60R 11/04; B60R 2011/0026; B60R 2300/105; B60R 2300/107; H04N 5/2252
See application file for complete search history.

(56) References Cited

U.S. PATENT DOCUMENTS

| | | | |
|---|---|---|---|
| 2014/0055616 A1* | 2/2014 | Corcoran | H04N 7/181 348/148 |
| 2018/0330526 A1* | 11/2018 | Corcoran | H04N 7/181 |
| 2019/0028721 A1* | 1/2019 | Rutschman | H04N 5/247 |
| 2019/0143906 A1 | 5/2019 | Furutake et al. | |
| 2019/0166307 A1 | 5/2019 | Murao et al. | |
| 2019/0166313 A1 | 5/2019 | Furutake et al. | |
| 2020/0112657 A1* | 4/2020 | Stein | H04N 5/2253 |

(Continued)

FOREIGN PATENT DOCUMENTS

| | | |
|---|---|---|
| DE | 10 2012 204 192 A1 | 9/2013 |
| DE | 10 2015 217 265 A1 | 3/2017 |
| DE | 102018220427 A1 | 5/2019 |

(Continued)

*Primary Examiner* — Patrick E Demosky
(74) *Attorney, Agent, or Firm* — MASCHOFF BRENNAN

(57) ABSTRACT

A vehicle compound-eye camera includes: a plurality of cameras arranged to be spaced apart from each other in a predetermined direction and disposed such that respective maximum image-pickup ranges of the plurality of cameras are partially shifted from each other in the predetermined direction; and a processor configured to set an overlapping image-pickup range in which each of the plurality of cameras picks up an image of a same target object from a different viewpoint. The processor is configured to set an image-pickup range of one of the cameras disposed on one end in the predetermined direction to have a relatively wide angle. The processor is configured to set an image-pickup range of another of the cameras disposed on the other end in the predetermined direction to have a relatively narrow angle.

4 Claims, 7 Drawing Sheets

(56) References Cited

U.S. PATENT DOCUMENTS

2020/0267332 A1\*  8/2020  van den Brink ...... B60R 21/013
2021/0302541 A1\*  9/2021  Fields ...................... H05K 7/14

FOREIGN PATENT DOCUMENTS

| JP | 2017-081261 A | 5/2017 |
| JP | 2019-089528 A | 6/2019 |
| JP | 2019-102889 A | 6/2019 |
| JP | 2019-172032 A | 10/2019 |

\* cited by examiner

VEHICLE COMPOUND-EYE CAMERA

CROSS-REFERENCE TO RELATED APPLICATION

This application claims priority to Japanese Patent Application No. 2020-166693 filed on Oct. 1, 2020, incorporated herein by reference in its entirety.

BACKGROUND

1. Technical Field

The disclosure relates to a vehicle compound-eye camera that is mounted on a vehicle and picks up an image of a world outside the vehicle.

2. Description of Related Art

In recent vehicles such as motor vehicles, a system that avoids collision or reduces damage due to the collision by determining a possibility of a collision with an object in front of the vehicle and automatically activating a brake when the possibility of a collision is high is put to practical use.

A stereo camera is mounted on a vehicle employing the system as one of sensing cameras that recognize an object existing in a world outside the vehicle. The stereo camera is disposed such that lenses of cameras face an upper-central portion of a windshield of the vehicle from the inside of the vehicle, for example. In the stereo camera, a place in front of the vehicle is photographed by cameras for both of left and right lenses through the windshield.

SUMMARY

In recent years, the standard of an advanced emergency braking system (AEBS) and the difficulty of a scenario of a new car assessment program (NCAP) have risen, and a sensing camera having an image-pickup range (detection area) with a wider angle has been needed. However, as a result of research performed by inventors of the present application, it has been found that various problems occur when image-pickup ranges of left and right cameras are caused to have wide angles for the case of a stereo camera.

The disclosure is capable of causing an image-pickup range to have a wide angle and avoiding various problems that occur when image-pickup ranges of all image-pickup means (cameras) have wide angles.

An aspect of the disclosure is a vehicle compound-eye camera. The vehicle compound-eye camera includes: a plurality of cameras arranged to be spaced apart from each other in a predetermined direction and disposed such that respective maximum image-pickup ranges of the plurality of cameras are partially shifted from each other in the predetermined direction; and a processor configured to set an overlapping image-pickup range in which each of the plurality of cameras picks up an image of the same target object from a different viewpoint. The processor is configured to set an image-pickup range of one of the cameras disposed on one end in the predetermined direction to have a relatively wide angle. The processor is configured to set an image-pickup range of another of the cameras disposed on the other end in the predetermined direction to have a relatively narrow angle.

According to this configuration, the maximum image-pickup ranges of the plurality of image-pickup means are disposed to be partially shifted from each other in the predetermined direction. As a result, detection of an object by stereoscopy is possible in a region in which the maximum image-pickup ranges of the image-pickup means overlap with each other, and detection of an object by monocular vision is possible in a region in which the maximum image-pickup ranges do not overlap with each other. Therefore, as compared to a stereo camera of the related art, the angle of the image-pickup range in the entire vehicle compound-eye camera can be significantly widened.

The image-pickup range of the image-pickup means disposed on one end in the predetermined direction is set to have a relatively wide angle, and the image-pickup range of the image-pickup means disposed on the other end is set to have a relatively narrow angle. By the setting above, various problems that occur when the image-pickup ranges of all of the image-pickup means are caused to have wide angles can be avoided.

The vehicle compound-eye camera may further include a hood that extends toward a light transmitting member from a lower side of the plurality of cameras and prevents a reflection image caused by reflected light at the light transmitting member from appearing in the image-pickup ranges of the cameras. The plurality of cameras may be disposed to face the light transmitting member provided in the vehicle and may be configured to pick up an image of the world outside the vehicle through the light transmitting member.

According to this configuration, a reflection image caused by reflected light at the light transmitting member can be prevented from appearing in the image-pickup ranges of the image-pickup means. For example, a reflection image of an object placed on a dashboard can be prevented from appearing in the image-pickup ranges of the image-pickup means.

In the configuration including the hood, there is a problem in that the size of the hood increases when the image-pickup ranges of all of the image-pickup means are caused to have wide angles. The image-pickup range of the image-pickup means disposed on one end in the predetermined direction is set to have a relatively wide angle, and the image-pickup range of the image-pickup means disposed on the other end is set to have a relatively narrow angle. As a result, the size of the hood can be reduced to a small size.

For example, when the light transmitting member is a windshield and the vehicle compound-eye camera is used as a front camera disposed in front of a rearview mirror so as to face the windshield, there is a possibility that the projecting portion obstructs the visibility of the driver when the hood projects to the driver seat side.

In the vehicle compound-eye camera, the hood may have a part that abuts against the light transmitting member and a remaining part that is separated from the light transmitting member. According to the abovementioned configuration, the amount by which the hood projects to the driver seat side can be reduced, and the visibility of the driver can be secured.

Even when the vehicle compound-eye camera has a configuration that does not include a hood, there is a problem in that the data amount of the images picked up by all of the image-pickup means becomes large and the image processing amount increases when the image-pickup ranges of all of the image-pickup means are caused to have wide angles. This problem can also be avoided because, when the image-pickup range of the image-pickup means disposed on one end in the predetermined direction is set to have a relatively wide angle and the image-pickup range of the image-pickup means disposed on the other end is set to have a relatively narrow angle, the data amount (the image data amount subject to the image processing) of the image picked up by the image-pickup means disposed on the other end is reduced.

The hood may have a part that abuts against the light transmitting member and a remaining part that is separated from the light transmitting member.

This configuration is suitable when the light transmitting member is a windshield and the vehicle compound-eye camera is used as a front camera disposed in front of the rearview mirror so as to face the windshield. By this configuration, wind of a defroster of the vehicle passes through a place between the hood and the light transmitting member and hits a region in the light transmitting member facing the image-pickup means. As a result, frost formation, ice accretion, and condensation in the region can be eliminated. Therefore, an image of the outside world can be picked up by the vehicle compound-eye camera through the light transmitting member in an excellent manner.

According to the disclosure, the image-pickup range can be caused to have a wide angle, and various problems that occur when the image-pickup ranges of all of the image-pickup means (cameras) are caused to have wide angles can be avoided.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

An embodiment of the disclosure is described in detail below with reference to the accompanying drawings.

Mechanical Configuration of Stereo Camera

Figure 1:
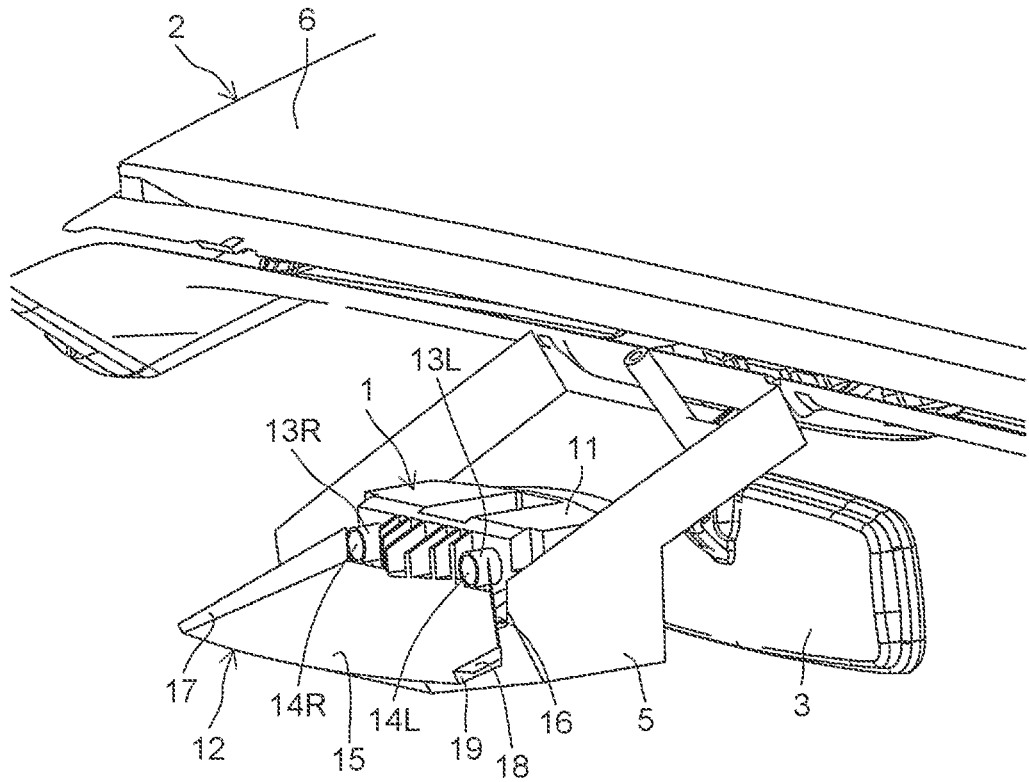
FIG. 1 is a perspective view of a stereo camera according to one embodiment of the disclosure and illustrates a state in which a stereo camera is mounted on a vehicle.
Figure 2:
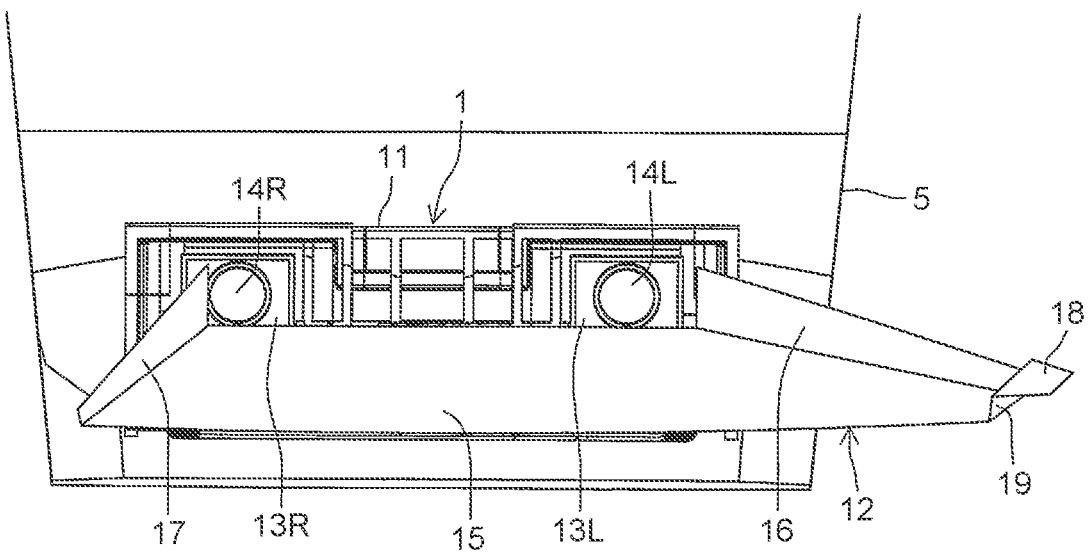
FIG. 2 is a front view of the stereo camera and a camera cover illustrated in FIG. 1.
Figure 3:
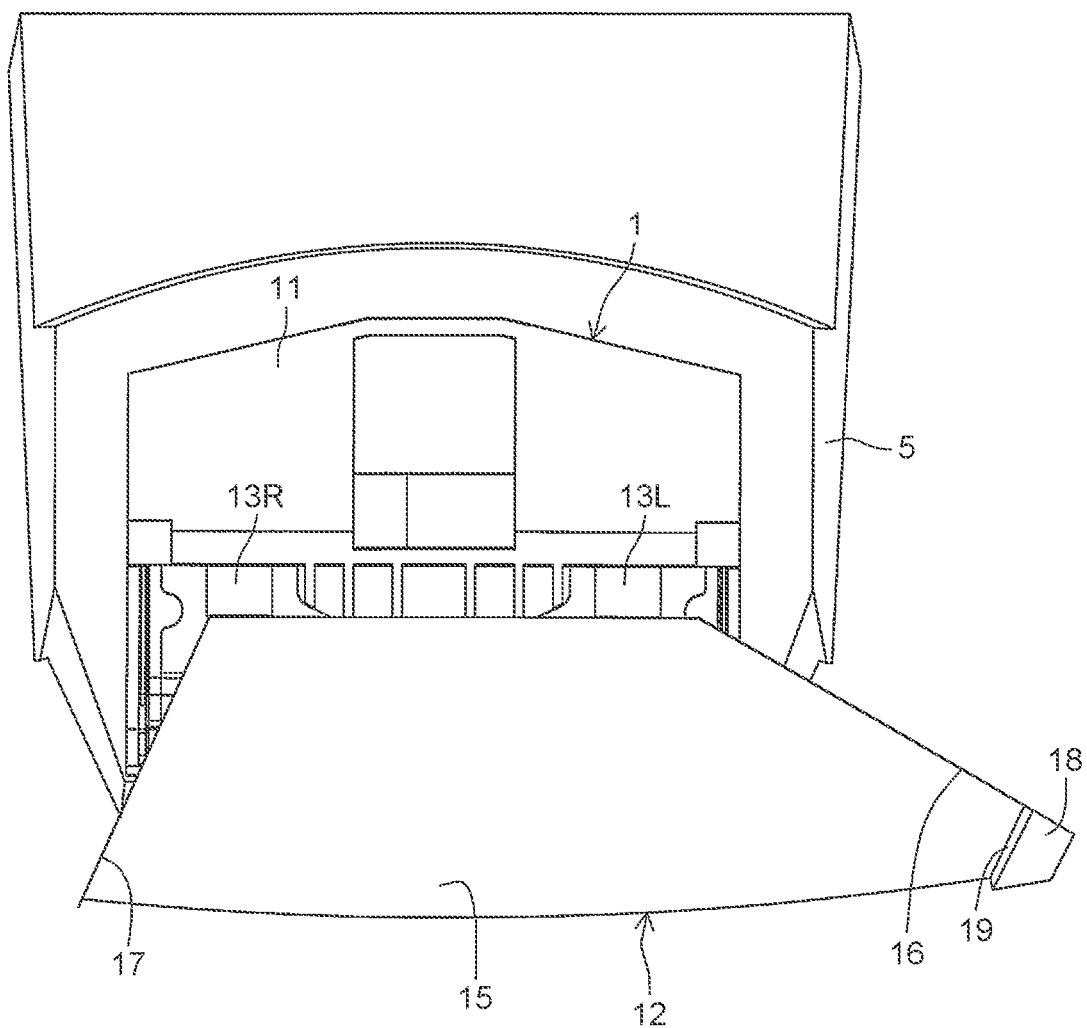
FIG. 3 is a plan view of the stereo camera and the camera cover illustrated in FIG. 1.
Figure 4:
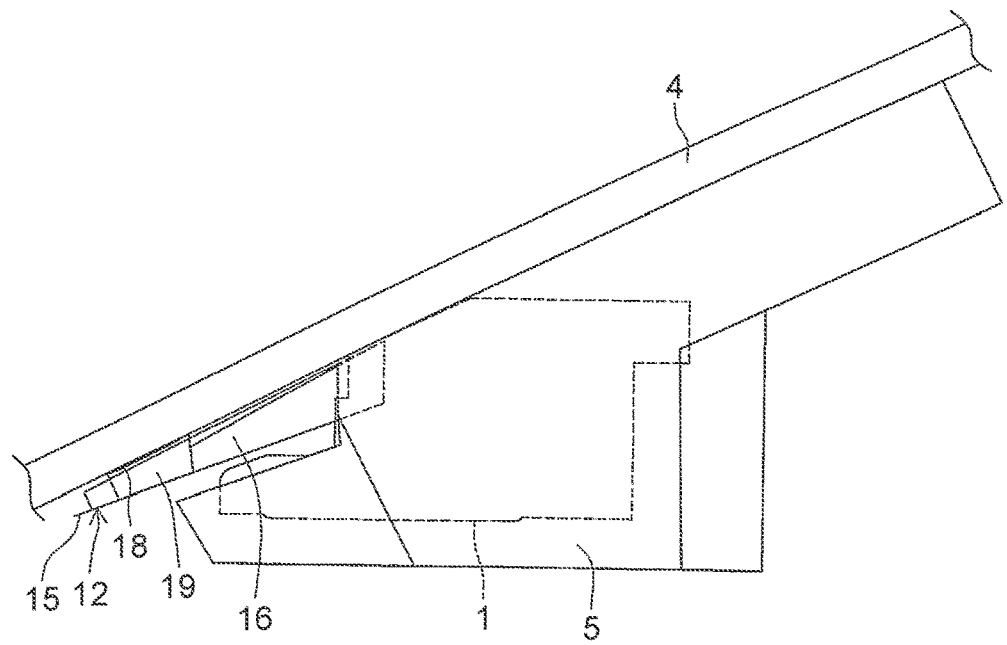
FIG. 4 is a left side view of the stereo camera and the camera cover illustrated in FIG. 1.

FIG. 1 is a perspective view of a stereo camera 1 according to one embodiment of the disclosure and illustrates a state in which the stereo camera 1 is mounted on a vehicle 2. FIG. 2 is a front view of the stereo camera 1 and a camera cover 5. FIG. 3 is a plan view of the stereo camera 1 and the camera cover 5. FIG. 4 is a side view of the stereo camera 1 and the camera cover 5.

As illustrated in FIG. 1, the stereo camera 1 is mounted on the vehicle 2 in which a driving assistance system is employed as a sensing camera that recognizes a world outside the vehicle 2, in particular, an object existing in front of the vehicle 2. The driving assistance system has one or a plurality of a collision avoidance assistance brake function for automatically activating a brake in accordance with a possibility of a collision between the vehicle 2 and the object in front of the vehicle 2 and avoiding collision or reducing damage caused by the collision, a lane keeping assist (LKA) function for causing the vehicle 2 to travel such that the vehicle 2 is kept in a lane in which the vehicle 2 is travelling, an adaptive cruise control (ACC) function for causing the vehicle 2 to travel such that the vehicle 2 follows a leading vehicle, a parking assistance function for assisting steering when the vehicle 2 is to be parked in a parking position, and a blind spot monitor (BSM) function for monitoring a blind spot of a driver, for example.

The stereo camera 1 is disposed in a place in front of a rearview mirror 3 of the vehicle 2 so as to face an upper portion of a windshield 4 (see FIG. 4) in the center of the windshield 4 in a left-right direction (vehicle width direction). The stereo camera 1 is held in the camera cover 5 in a state in which a lower surface, a rear surface, and both side surfaces thereof are covered with the camera cover 5. The camera cover 5 is fixed to a ceiling 6 of the vehicle 2. As a result, the stereo camera 1 is mounted on the vehicle 2.

The stereo camera 1 includes a camera main body 11 and an antireflection hood 12 attached to the camera main body 11.

In the camera main body 11, a pair of left and right cameras 13L, 13R are provided. The cameras 13L, 13R are disposed to be apart from each other in a left-right direction such that lenses 14L, 14R thereof face the windshield 4.

The antireflection hood 12 has a substantially-plate-like shape and extends to the lower front side from a front surface of the camera main body 11. Specifically, the antireflection hood 12 has a hood main-body portion 15, hood side portions 16, 17, and an abutting portion 18 in an integral manner. The hood main-body portion 15 has a plate-like shape, and a rear end edge thereof is disposed in a substantially same position as front ends of the cameras 13L, 13R on the lower side of the cameras 13L, 13R and extends to the lower front side from the position. The hood main-body portion 15 is formed to be wider in the left-right direction on the front side, and a left side end thereof is inclined with respect to a front-rear direction at an inclination angle that is larger than that of a right side end. The hood side portions 16, 17 rise to the upper side from the left side end and the right side end of the hood main-body portion 15. The front end 19 of the hood side portion 16 on the left side is bent to the inner side (the central side of the hood main-body portion 15 in the left-right direction). The abutting portion 18 extends to the outer side from an upper end of the front end 19 of the hood side portion 16.

Black ceramic BC (see FIG. 7) is printed on a peripheral portion of the windshield 4 of the vehicle 2. The abutting portion 18 of the antireflection hood 12 abuts against the windshield 4 at a place outside a range in which the black ceramic BC is printed, and the remaining parts of the antireflection hood 12, that is, the hood main-body portion 15 and the hood side portions 16, 17 are separated from the windshield 4. The hood side portion 17 on the right side faces the windshield 4 in the front-rear direction within a printed range of the black ceramic BC. The black ceramic BC is not printed in portions of the windshield 4 that come into the field of view of the cameras 13L, 13R such that the black ceramic BC do not obstruct image-pickup performed by the cameras 13L, 13R.

Electrical Configuration of Stereo Camera

Figure 5:
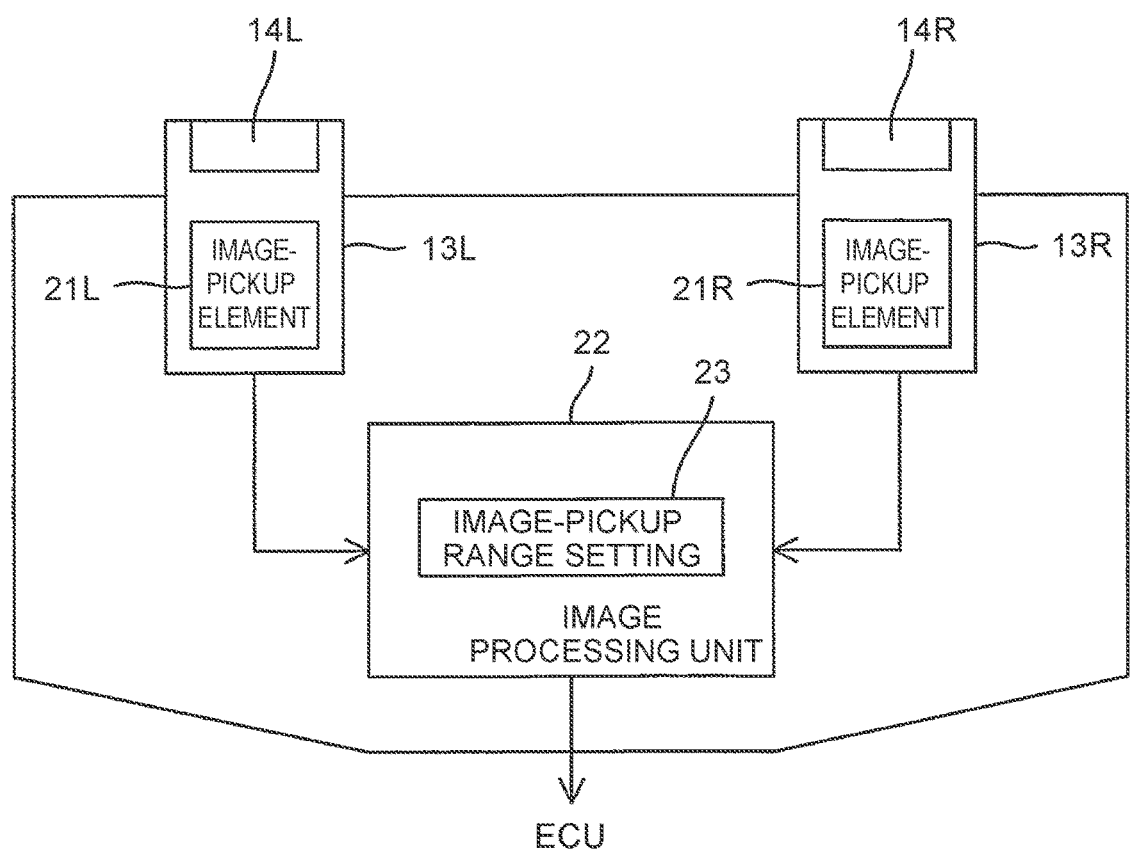
FIG. 5 is a block diagram illustrating an electrical configuration of the stereo camera illustrated in FIG. 1.

FIG. 5 is a block diagram illustrating an electrical configuration of the stereo camera 1.

The camera 13L on the left side includes an image-pickup element (an imager, an image sensor) 21L that picks up a field of view of the lens 14L via the lens 14L. The camera 13R on the right side includes an image-pickup element 21R that picks up a field of view of the lens 14R via the lens 14R. Angles of view (viewing angles) of the left and right lenses 14L, 14R are the same and are within the range of 120° to 160°, for example.

The stereo camera 1 includes an image processing unit 22. Image data of which image is picked up by the image-pickup elements 21L, 21R is input to the image processing unit 22. The image processing unit 22 has a microcontroller having a CPU and a memory that are built in, and performs image processing on the image data input from the image-pickup elements 21L, 21R.

For example, the image processing unit 22 extracts target pixels corresponding to the same target object in images picked up by the image-pickup elements 21L, 21R from a pair of image data input from the image-pickup elements 21L, 21R, detects an amount of deviation in positions of the target pixels between the pair of images, and calculates the distance from the same target object by the principle of triangulation. As a result, position information on a three-dimensional space also including information on depth can be acquired. The information acquired by the image processing is transmitted to an electronic control unit (ECU) mounted on the vehicle from the image processing unit 22 by communication by a controller area network (CAN) communication protocol.

The image processing unit 22 substantially includes an image-pickup range setting unit 23 that individually sets image-pickup ranges of the cameras 13L, 13R as a function processing unit.

Image-Pickup Ranges

Figure 6:
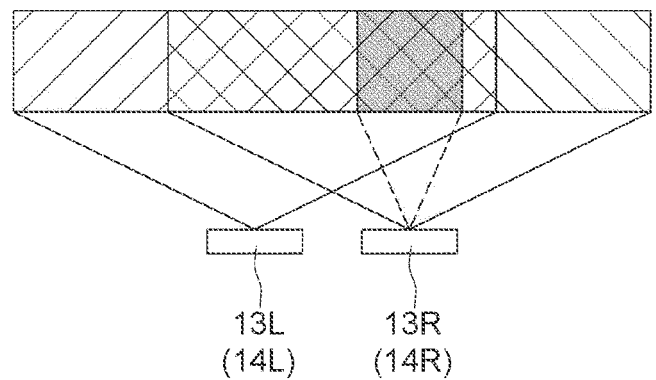
FIG. 6 is a diagram for describing an image-pickup range of each camera in the stereo camera illustrated in FIG. 1.

FIG. 6 is a diagram for describing the image-pickup ranges of the cameras 13L, 13R.

Maximum image-pickup ranges (maximum fields of view) of the cameras 13L, 13R are angles of view of the lenses 14L, 14R, and the cameras 13L, 13R are disposed such that the maximum image-pickup ranges are partially shifted from each other in the left-right direction. The image-pickup range setting unit 23 sets the image-pickup ranges of the cameras 13L, 13R within the maximum image-pickup ranges. As a result, in the image processing unit 22, image data in which an image of the set image-pickup ranges is picked up out of the image data input from the image-pickup elements 21L, 21R is the target of the image processing.

In the stereo camera 1 having the configuration illustrated in FIGS. 1 to 4, the image-pickup range setting unit 23 sets the image-pickup range of the camera 13L on the left side to the maximum image-pickup range. In FIG. 6, hatching inclined diagonally down to the left is applied to the image-pickup range. Meanwhile, the image-pickup range setting unit 23 sets the image-pickup range of the camera 13R on the right side within a range in which the maximum image-pickup range of the camera 13L on the left side and the maximum image-pickup range of the camera 13R on the right side overlap with each other, that is, a range to which cross-hatching is applied in FIG. 6. In FIG. 6, the image-pickup range of the camera 13R on the right side is colored with gray. As a result, the image-pickup range of the camera 13L on the left side is set to have a relatively wide angle, and the image-pickup range of the camera 13R on the right side is set to have a relatively narrow angle.

In the example illustrated in FIG. 6, the image-pickup range of the camera 13R on the right side is set such that a central line (optical axis) of the image-pickup range of the camera 13R on the right side extends in the front-rear direction, but the central line may be set to be inclined with respect to the front-rear direction as long as the image-pickup range of the camera 13R on the right side is within a range in which the maximum image-pickup range of the camera 13L on the left side and the maximum image-pickup range of the camera 13R on the right side overlap with each other.

Even when the inclination angle of the right side end of the hood main-body portion 15 of the antireflection hood 12 is smaller than the inclination angle of the left side end thereof and the antireflection hood 12 does not greatly project to the right side, a reflection image caused by reflected light at the windshield 4 can be prevented from appearing in the image-pickup ranges of the cameras 13L, 13R. For example, a reflection image of an object placed on a dashboard of the vehicle 2 is prevented from appearing in the image-pickup ranges of the cameras 13L, 13R by the antireflection hood 12.

Effects

As described above, the maximum image-pickup ranges of the cameras 13L, 13R are disposed to be partially shifted from each other in the predetermined direction. As a result, detection of an object by stereoscopy is possible in a region in which the maximum image-pickup ranges of the cameras 13L, 13R overlap with each other, and detection of an object by monocular vision is possible in a region in which the maximum image-pickup ranges do not overlap with each other. Therefore, as compared to a stereo camera of the related art, the angle of the image-pickup range in the entire stereo camera 1 can be significantly widened.

The image-pickup range of the camera 13L on the left side is set to have a relatively wide angle, and the image-pickup range of the camera 13R on the right side is set to have a relatively narrow angle. By the setting above, various problems that occur when the image-pickup ranges of both of the left and right cameras 13L, 13R are caused to have wide angles can be avoided.

Figure 7:
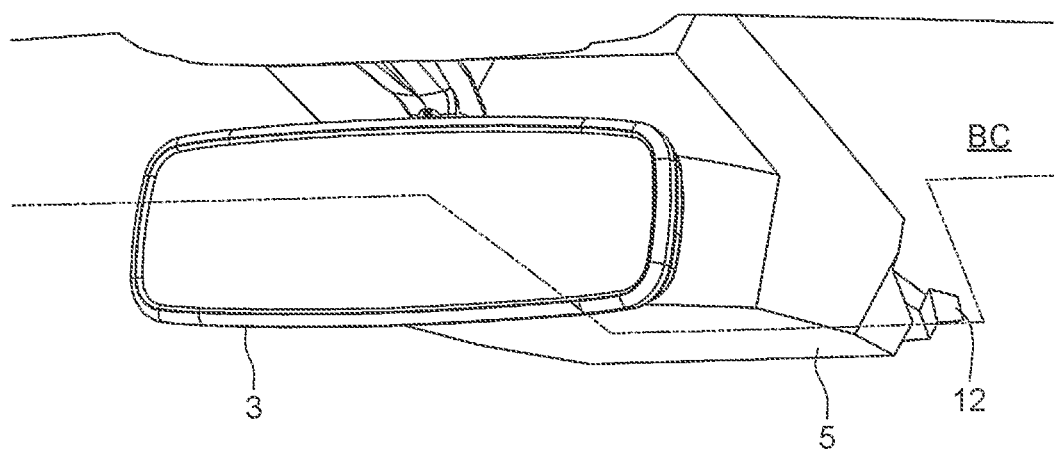
FIG. 7 is a perspective view of the stereo camera and the camera cover illustrated in FIG. 1 and illustrates a state seen from the inside of the vehicle.

The cameras 13L, 13R are disposed to face the windshield 4 of the vehicle 2 and are provided so as to pick up an image of the world outside the vehicle 2 through the windshield 4, and the antireflection hood 12 that prevents a reflection image caused by reflected light at the windshield 4 from appearing in the image-pickup ranges of the cameras 13L, 13R is provided on the stereo camera 1. In this configuration, when the image-pickup ranges of both of the left and right cameras 13L, 13R are caused to have wide angles, there is a problem in that the size of the antireflection hood 12 is increased in order to prevent the reflection image caused by the reflected light at the windshield 4 from appearing in the image-pickup ranges. The image-pickup range of the camera 13L on the left side is set to have a relatively wide angle, and the image-pickup range of the camera 13R on the right side is set to have a relatively narrow angle. As a result, as illustrated in FIG. 7, the amount by which the antireflection hood 12 projects to the right side can be reduced, and the size of the antireflection hood 12 can be reduced to a small size. For example, when the vehicle 2 is a right-hand drive vehicle, the visibility of the driver can be secured because the amount by which the antireflection hood 12 projects to the driver seat side is small.

There is a problem in that the data amount of the images picked up by the cameras 13L, 13R becomes large and the image processing amount increases when the image-pickup ranges of both of the left and right cameras 13L, 13R are caused to have wide angles. The image-pickup range of the camera 13L on the left side is set to have a relatively wide angle, and the image-pickup range of the camera 13R on the right side is set to have a relatively narrow angle. As a result, the data amount (the image data amount subject to the image processing) of the image picked up by the camera 13R on the right side is reduced, and hence the problem in that the image processing amount increases can be avoided.

The abutting portion 18 of the antireflection hood 12 abuts against the windshield 4, and the remaining parts of the antireflection hood 12, that is, the hood main-body portion 15 and the hood side portions 16, 17 are separated from the windshield 4. As a result, wind of a defroster of the vehicle 2 passes through a place between the antireflection hood 12 and the windshield 4 and hits a region (a region in which the black ceramic BC is not printed) in the windshield 4 that faces the cameras 13L, 13R. As a result, frost formation, ice accretion, and condensation in the region can be eliminated. Therefore, an image of the outside world can be picked up by the stereo camera 1 through the windshield 4 in an excellent manner.

Modified Example

One embodiment of the disclosure has been described above, but the disclosure can be carried out in other forms.

Figure 8:
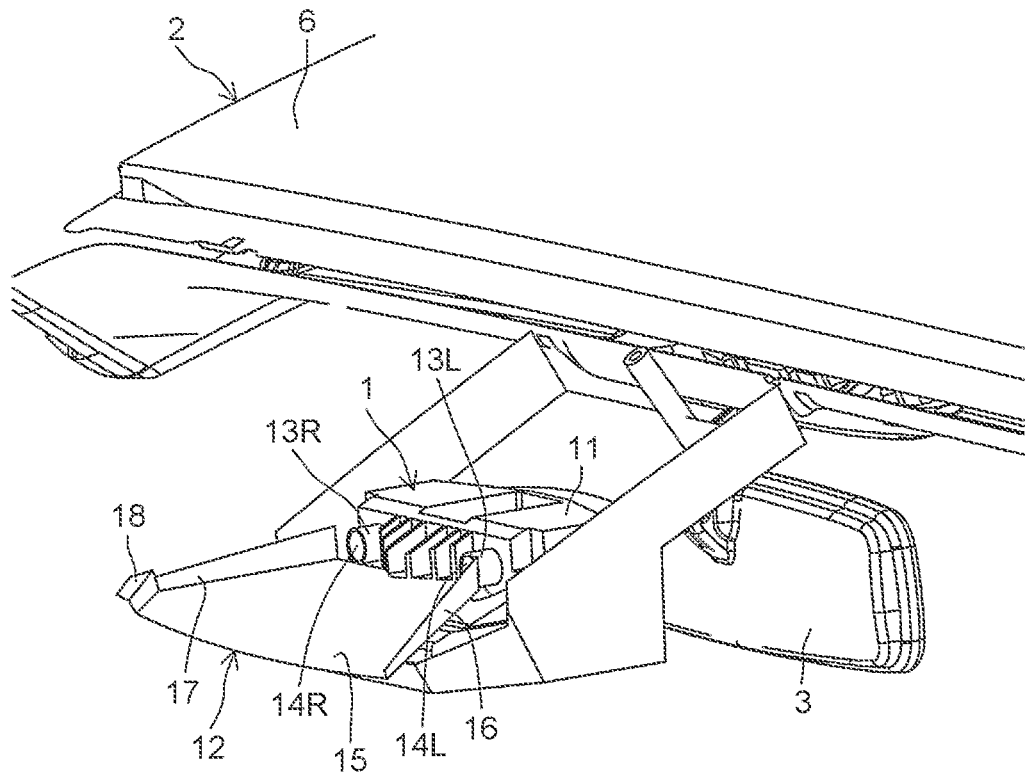
FIG. 8 is a perspective view of a stereo camera according to a modified example and illustrates a state in which the stereo camera is mounted on a vehicle.
Figure 9:
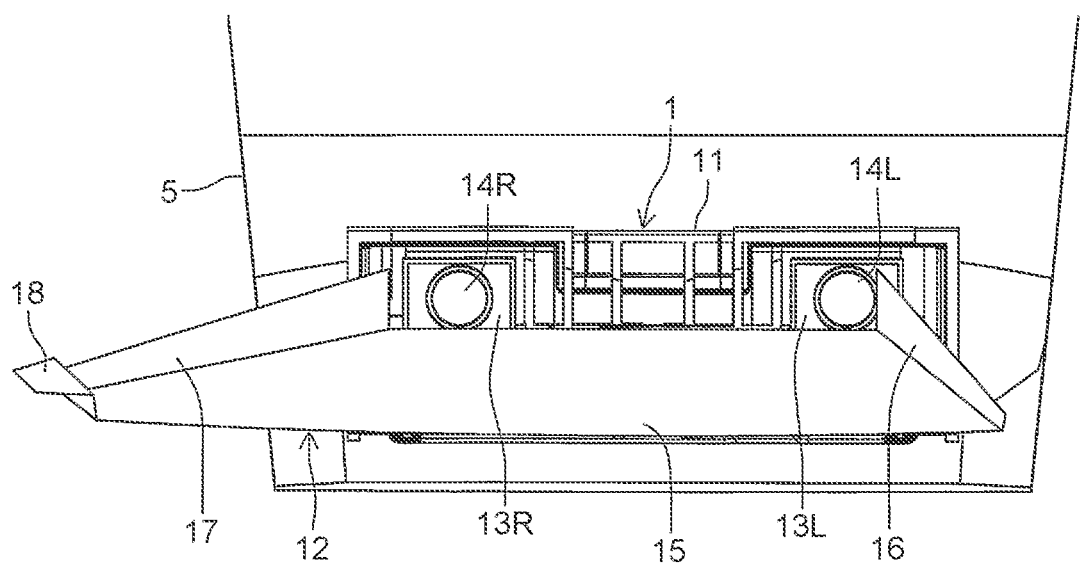
FIG. 9 is a front view of the stereo camera and a camera cover illustrated in FIG. 8.
Figure 10:
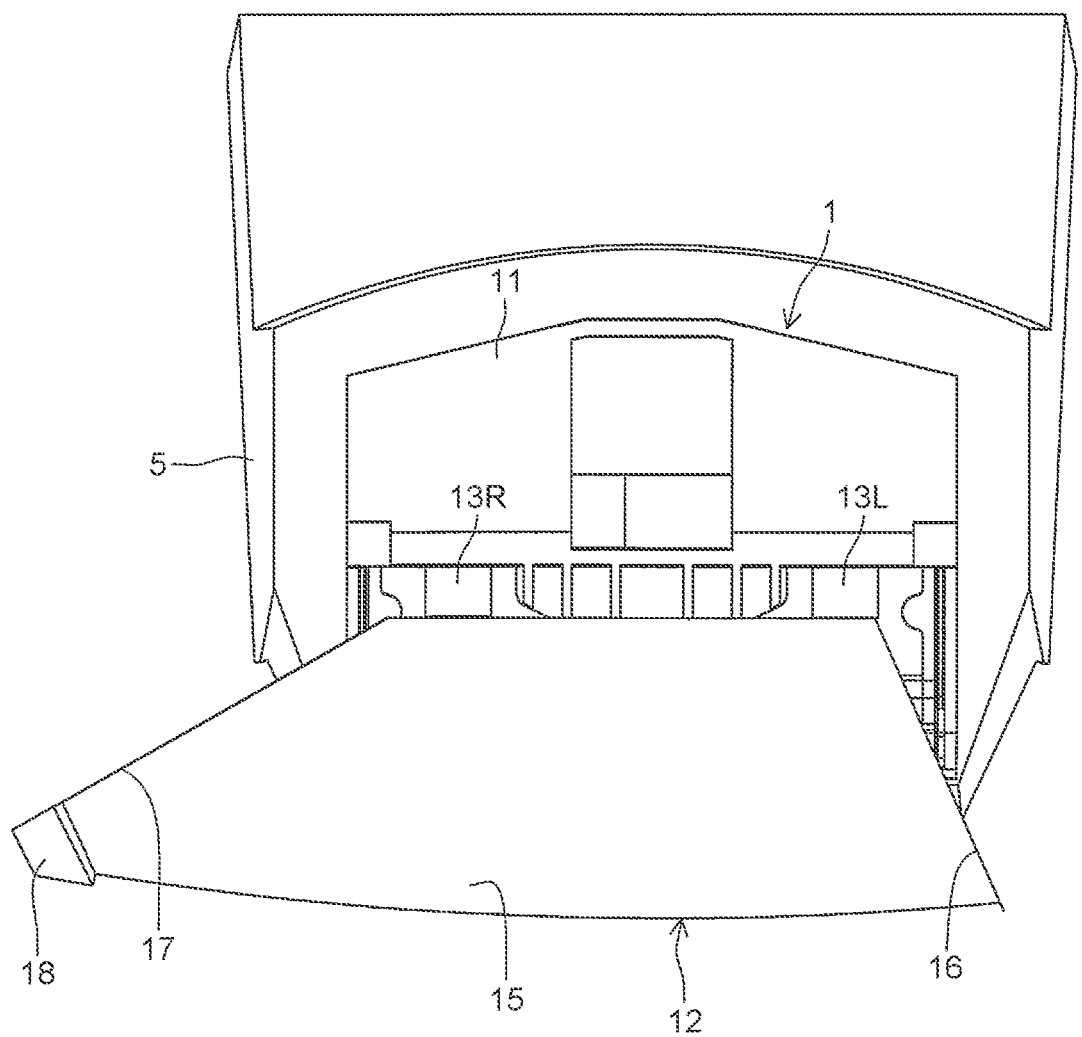
FIG. 10 is a plan view of the stereo camera and the camera cover illustrated in FIG. 8.

For example, as illustrated in FIG. 8, FIG. 9, and FIG. 10, a configuration that is left-right flipped from the configuration illustrated in FIG. 1 to FIG. 3 may be employed in the stereo camera 1. The configuration illustrated in FIG. 8 to FIG. 10 is a configuration that is left-right flipped from the configuration illustrated in FIG. 1 to FIG. 3. Therefore, a front end of the hood side portion 17 on the right side is bent to the inner side, and the abutting portion 18 extends to the outer side from an upper end of the front end. The configuration illustrated in FIG. 8 to FIG. 10 is suitable when the vehicle 2 is a left-hand drive vehicle.

Figure 11:
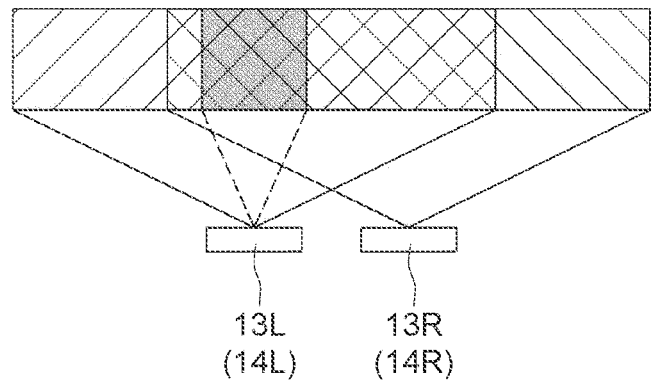
FIG. 11 is a diagram for describing an image-pickup range of each camera in the stereo camera illustrated in FIG. 8.

In the stereo camera 1 having the configuration illustrated in FIG. 8 to FIG. 10, the image-pickup range of the camera 13R on the right side is set to the maximum image-pickup range by the image-pickup range setting unit 23. In FIG. 11, hatching inclined diagonally down to the right is applied to the image-pickup range. Meanwhile, the image-pickup range setting unit 23 sets the image-pickup range of the camera 13L on the left side within a range in which the maximum image-pickup range of the camera 13L on the left side and the maximum image-pickup range of the camera 13R on the right side overlap with each other, that is, a range to which cross-hatching is applied in FIG. 11. In FIG. 11, the image-pickup range of the camera 13L on the left side is colored with gray. As a result, the image-pickup range of the camera 13L on the left side is set to have a relatively wide angle, and the image-pickup range of the camera 13R on the right side is set to have a relatively narrow angle. In other words, the image-pickup range setting unit 23 can switch the cameras between the camera that causes the image-pickup range to have a relatively wide angle and the camera that causes the image-pickup range to have a relatively narrow angle by changing a setting value of the image-pickup range on software.

Figure 12:
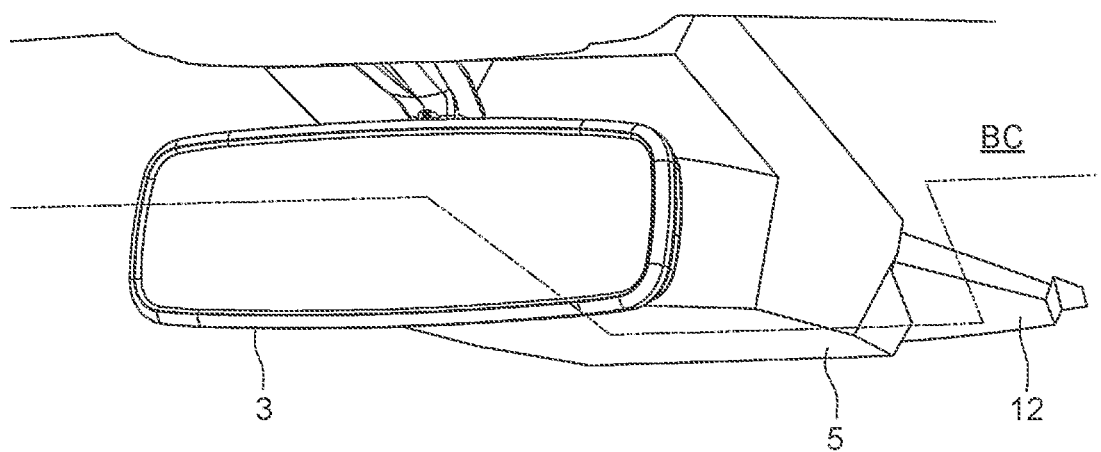
FIG. 12 is a perspective view of the stereo camera and the camera cover illustrated in FIG. 8 and illustrates a state seen from the inside of the vehicle.

Therefore, even when the inclination angle of the left side end of the hood main-body portion 15 of the antireflection hood 12 is smaller than the inclination angle of the right side end thereof and the antireflection hood 12 does not greatly project to the left side, the reflection image caused by the reflected light at the windshield 4 can be prevented from appearing in the image-pickup ranges of the cameras 13L, 13R by the antireflection hood 12. For example, a reflection image of an object placed on the dashboard of the vehicle 2 is prevented from appearing in the image-pickup ranges of the cameras 13L, 13R by the antireflection hood 12. As a result, as illustrated in FIG. 12, the visibility of the driver can be secured because the amount by which the antireflection hood 12 projects to the driver seat side is kept small.

In the example illustrated in FIG. 11, the image-pickup range of the camera 13L on the left side is set such that a central line of the image-pickup range of the camera 13L on the left side extends to the front-rear direction, but the central line may be set to be inclined with respect to the front-rear direction as long as the image-pickup range of the camera 13L on the left side is within a range in which the maximum image-pickup range of the camera 13L on the left side and the maximum image-pickup range of the camera 13R on the right side overlap with each other.

The stereo camera 1 is disposed to face the windshield 4, but may be disposed to face a rear window and be used as a rear camera that picks up an image of a place behind the vehicle 2, or may be disposed to face a side window and be used as a side camera that picks up an image of a place on the side of the vehicle 2, for example.

The stereo camera 1 having the cameras 13L, 13R for both of left and right lenses have been introduced as one example of the vehicle compound-eye camera, but the disclosure can also be applied to a triple-lens camera in which three cameras are disposed side by side and can also be applied to a multi-eye camera in which four or more cameras are disposed side by side.

Besides the above, various design changes can be made in the abovementioned configuration within the range of the features described in the claims.

What is claimed is:

1. A vehicle compound-eye camera that picks up an image of a world outside of a vehicle, the vehicle compound-eye camera comprising:
   a plurality of cameras arranged to be spaced apart from each other in a predetermined direction and disposed such that respective maximum image-pickup ranges of the plurality of cameras are partially shifted from each other in the predetermined direction and the maximum image-pickup ranges of each of the plurality of cameras partially overlap with each other and a portion of the maximum image-pickup ranges of each of the plurality of cameras do not overlap with each other, wherein the plurality of cameras have the same angle of view; and
   a processor configured to set an overlapping image-pickup range in which each of the plurality of cameras picks up an image of a same target object from a different viewpoint, wherein:
   the processor is configured to set an image-pickup range of a first camera of the plurality of cameras disposed on one end in the predetermined direction to have a first angle;
   the processor is configured to set an image-pickup range of a second camera of the plurality of cameras disposed on another end in the predetermined direction to have a second angle, the second angle being narrower than the first angle, wherein the processor sets the image-pickup range of the second camera to be within an overlapping range in which a maximum image-pickup range of the first camera and a maximum image-pickup range of the second camera overlap each other, and an entirety of the image-pickup range of the second camera is set to be within the overlapping range.

2. The vehicle compound-eye camera according to claim 1, further comprising a hood that extends toward a light transmitting member from a lower side of the plurality of cameras and prevents a reflection image caused by reflected light at the light transmitting member from appearing in the image-pickup ranges of the plurality of cameras, wherein the plurality of cameras are disposed to face the light transmitting member provided in the vehicle and are configured to pick up an image of the world outside the vehicle through the light transmitting member.

3. The vehicle compound-eye camera according to claim 2, wherein the hood includes a part that abuts against the light transmitting member and a remaining part that is separated from the light transmitting member.

4. A method for capturing an image of an environment outside of a vehicle, the method comprising:

arranging a plurality of cameras to be spaced apart from each other in a predetermined direction such that respective maximum image-pickup ranges of the plurality of cameras are partially shifted from each other in the predetermined direction and the maximum image-pickup ranges of each of the plurality of cameras partially overlap with each other and a portion of the maximum image-pickup ranges of each of the plurality of cameras do not overlap with each other, wherein the plurality of cameras have the same angle of view;

setting an overlapping image-pickup range in which each of the plurality of cameras picks up an image of a same target object from a different viewpoint;

setting an image-pickup range of a first camera of the plurality of cameras disposed on one end in the predetermined direction to have a first angle; and setting an image-pickup range of a second camera of the plurality of cameras disposed on another end in the predetermined direction to have a second angle, the second angle being narrower than the first angle, wherein the image-pickup range of the second camera is set to be within an overlapping range in which a maximum image-pickup range of the first camera and a maximum image-pickup range of the second camera overlap each other, and an entirety of the image-pickup range of the second camera is set to be within the overlapping range.

* * * * *